United States Patent
Chang et al.

(10) Patent No.: US 9,893,375 B2
(45) Date of Patent: Feb. 13, 2018

(54) MODULE SYSTEM FOR MICROBIAL FUEL CELL

(75) Inventors: In Seop Chang, Gwangju (KR); Daehee Kim, Gwangju (KR); Junyeong An, Gwangju (KR)

(73) Assignee: GWANGJU INSTITUTE OF SCIENCE AND TECHNOLOGY, Buk-Gu, Gwangju (KR)

( * ) Notice: Subject to any disclaimer, the term of this patent is extended or adjusted under 35 U.S.C. 154(b) by 286 days.

(21) Appl. No.: 13/325,411

(22) Filed: Dec. 14, 2011

(65) Prior Publication Data

US 2012/0315506 A1 Dec. 13, 2012

(30) Foreign Application Priority Data

Jun. 10, 2011 (KR) ........................ 10-2011-0056068

(51) Int. Cl.
*H01M 8/16* (2006.01)

(52) U.S. Cl.
CPC ............. *H01M 8/16* (2013.01); *Y02E 60/527* (2013.01)

(58) Field of Classification Search
CPC .............................. H01M 8/16; H01M 8/0297
USPC ...................................................... 429/2, 401
See application file for complete search history.

(56) References Cited

U.S. PATENT DOCUMENTS

| | | | | |
|---|---|---|---|---|
| 2003/0232000 A1* | 12/2003 | Lucas | ................... | C01D 7/38 423/421 |
| 2006/0216568 A1* | 2/2006 | Kohno et al. | ................ | 429/34 |
| 2007/0015037 A1* | 1/2007 | Cao | ................... | H01M 8/004 429/401 |
| 2007/0048577 A1* | 3/2007 | Ringeisen | ........... | H01M 8/0232 429/401 |
| 2008/0292912 A1* | 11/2008 | Logan et al. | ................ | 429/2 |
| 2009/0159455 A1* | 6/2009 | Logan et al. | ................ | 205/343 |
| 2010/0003543 A1* | 1/2010 | Zhou | ................... | 429/2 |
| 2010/0239920 A1* | 9/2010 | Sefton | ................... | H01M 8/16 429/401 |
| 2010/0279178 A1* | 11/2010 | Barkeloo et al. | ............ | 429/401 |

(Continued)

FOREIGN PATENT DOCUMENTS

JP 2010033824 A * 2/2010
WO WO 2009134035 A2 * 11/2009 ............. H01M 8/16

OTHER PUBLICATIONS

Machine translation of Fukase, JP 2010033824 A, Feb. 2010, Japanese.*

(Continued)

*Primary Examiner* — Jonathan Jelsma
*Assistant Examiner* — Rashid Alam
(74) *Attorney, Agent, or Firm* — Nath, Goldberg, & Meyer; Jerald L. Meyer; Stanley N. Protigal

(57) ABSTRACT

Disclosed is a module system for a microbial fuel cell used in the field of a microbial fuel cell, in which a plurality of unit cells electrically connected to each other in series cannot share an anode part solution. In the module system for the microbial fuel cell, the unit cells are electrically connected to each other in series, so that power is produced in a commercial scale. An anode part is given to each individual cell, so that voltage drop does not occur. The unit cells share an anode part solution together, so that the module system for the microbial fuel cell is simply designed. The module system for the microbial fuel cell is applicable when effectively producing power in the commercial scale.

6 Claims, 11 Drawing Sheets

(56) References Cited

U.S. PATENT DOCUMENTS

2011/0033757 A1* 2/2011 Chang .................... H01M 8/16
429/401
2011/0123893 A1* 5/2011 Lundblad et al. ............ 429/463

OTHER PUBLICATIONS

Daehee Kim, Junyeong An, Bongkyu Kim, Jae Kyung Jang, Byung Hong Kim, & In Seop Chang, Scaling-Up Microbial Fuel Cells: Configuration and Potential Drop Phenomenon at Series Connection of Unit Cells in Shared Anolyte, ChemSusChem, 2012, 5(6), 1086-1091.

Junyeong An, Bongkyu Kim, Jae Kyung Jang, Hyung-Sool Lee, & In Seop Chang, New architecture for modulization of membraneless and single-chambered microbial fuel cell using a bipolar plate-electrode assembly (BEA), Biosensors and Bioelectronics, 2014, 59, 28-34.

Junyeong An, Development of a Multiphase Electrode Microbial Fuel Cell System Converting Organics in Water and Sediment Phases into Electricity, Ph.D. thesis, 2012.

\* cited by examiner

MODULE SYSTEM FOR MICROBIAL FUEL CELL

CROSS-REFERENCE TO RELATED APPLICATION

This application claims the benefit under 35 U.S.C. §119 of Korean Patent Application No. 10-2011-0056068, filed on Jun. 10, 2011 in the Korean Intellectual Property Office, the entirety of which is incorporated herein by reference.

BACKGROUND OF THE INVENTION

1. Field of the Invention

The present invention relates to the field of a microbial fuel cell. In more particular, the present invention relates to a module system for a microbial fuel cell in which a plurality of unit cells electrically connected to each other in series cannot share an anode part solution.

2. Description of the Related Art

In general, an MFC (microbial fuel cell) is a device to convert chemical energy of a substrate oxidized through the metabolism of microorganisms into electrical energy. The MFC is mainly classified into two parts of a cathode and an anode. Both the cathode and anode must be separated from each other by an ion exchange membrane such that the cathode and anode electrodes may not come into contact with each other (see FIG. 1). According to the operating principle of the MFC, the substrate (mainly, organisms) in the substrate solution is oxidized by the microorganisms of the anode to produce electrons and hydrogen ions, and the electrons and the hydrogen ions are transferred to the cathode through an external circuit and the ion exchange membrane, respectively. Thereafter, the hydrogen ions transferred through the ion exchange membrane react with oxygen molecules supplied to the cathode and the electrons transferred to the cathode so that the hydrogen ions are reduced, thereby constructing a whole circuit. Therefore, the cell potential obtained through the MFC is given as the difference between the potential produced when the substrate is oxidized in the anode and the potential produced when an oxidizer is reduced in the cathode. Theoretically, energy can be continuously acquired through the electrochemical reaction if the substrate capable of maintaining the basal metabolism of the microorganisms is continuously supplied The electricity generation using the microorganisms has been spotlighted since the possibility of electricity production using colon *bacillus* (*E. coli*) has been verified in 1911 (Potter, 1911). A microbial cell capable of producing electricity of 35V or more in the case of in-series connection has been developed in 1931 (Cohen, 1931), and a hydrogen-air fuel cell using hydrogen, which is produced by fermenting glucose by microorganisms, as fuel has been developed in 1963 (DelCuca et al., 1963). However, the hydrogen-air fuel cell produces unstable current because a uniform amount of hydrogen is not produced by the microorganisms. In order to solve the problem, *clostridium bytyricum*, which is a bacterium to produce hydrogen, has been fixated on an electrode to produce stable current 1976 and 1977 (Karube et al., 1976, 1977). Since bio-fuel cells have been newly spotlighted in the late 1980, electricity production using microorganisms such as *E. coli, anabaena variabilis*, and *proteus vulgaris* in a fuel cell having a mediator acting as an electron shuttle has been attempted (Allen and Bennetto, 1993; Sell et al., 1989; Tanaka et al., 1988). The mediator is a material to promote the electron transfer from the outer skin of a bacteria cell having a non-conductive property to an anode. The mediator is reduced by electrons produced when microorganisms oxidize an organic compound, and then oxidized in the anode again to transfer electrons to the anode. As the mediator, methylene blue (Roller et al., 1984), thionine (Bennetto et al., 1985), 2-hydroxy-1,4-naphtoquinone (Akiba et al., 1985), and viologens (Akiba et al., 1985; Roller et al., 1984) have been extensively known. However, 100% of the mediators are not retrieved in the cell of the microorganism. Accordingly, when the mediators are used, the mediators must be continuously supplemented to enhance the efficiency of the fuel cell. When the mediators are continuously supplemented, the mediators accumulated in the cell of the microorganism act as toxic material against the microorganism, thereby stopping the metabolism of the microorganism, so that electricity production cannot be performed for a long time. The problem related to the mediator is solved by verifying the possibility of the electricity production by using *shewanella putrefaciens* which are bacteria having a mechanism to reduce insoluble ferric oxide outside a cell through an outer cell membrane based on reducing power generated through energy metabolism (Kim et al., 1999). After the applicability of the *shewanella putrefaciens* has been verified, the researches and studies on the microbial fuel cell have been more accelerated.

With the studies for the improvement in the efficiency of the electricity generation by the microbial fuel cell, the trials to produce power in a commercial scale by improving the output of the microbial fuel cell have been continuously performed. In order to generate power in the commercial scale as described above, the generated power must be increased and the loss of the power must be minimized. In addition, the system for the microbial fuel cell must be scaled up. Therefore, a system for a microbial fuel cell without voltage drop in a simple structure is strongly required.

SUMMARY OF THE INVENTION

An object of the present invention is to provide a module system for a microbial fuel cell, in which a plurality of microbial fuel cells serving as individual unit cells are electrically connected to each other in series and can share an anode part solution together.

In order to accomplish the object, according to one aspect of the present invention, there is provided a module system for a microbial fuel cell, which includes a unit cell including electrochemically active microorganisms, first and second electrodes arranged in opposition to each other, ion exchange membrane interposed between the first and second electrodes, a reactor serving as a housing for the electrochemically active microorganisms, the first and second electrodes, and the ion exchange membrane, and substrate inlet and outlet ports formed at one end and an opposite end of the reactor, respectively. A plurality of unit cells are vertically arranged, the substrate outlet port of one unit cell among the vertically arranged unit cells is linked with the substrate inlet port of another unit cell through a substrate sharing tube to form a module, at least two modules are provided, and the unit cell provided in one module is electrically connected to the unit cell provided in another module in series through a conductive wire.

According to another aspect of the present invention, there is provided a module system for a microbial fuel cell, which includes a unit cell which including a reactor provided in a lower end and an upper end thereof with a substrate inlet port and a substrate outlet port, respectively, a first electrode and a second electrode formed on a bottom surface and a top surface of the reactor, respectively, and electrochemically active microorganisms. A plurality of unit cells are vertically arranged, the vertically arranged unit cells are electrically connected to each other in series through a conductive film to form a module, at least two modules are provided, and the substrate outlet port of the unit cell provided in one module is linked with the substrate inlet port of the unit cell provided in another module through a substrate sharing tube.

As described above, according to the module system for the microbial fuel cell, the unit cells are electrically connected to each other in series, so that power can be produced in a commercial scale. In addition, an anode part is given to each individual cell, so that voltage drop does not occur. The unit cells share an anode part solution together, so that the module system for the microbial fuel cell can be simply designed. Accordingly, the module system for the microbial fuel cell according to the present invention can be applicable when effectively producing power in the commercial scale.

DETAILED DESCRIPTION OF THE INVENTION

Figure 1:
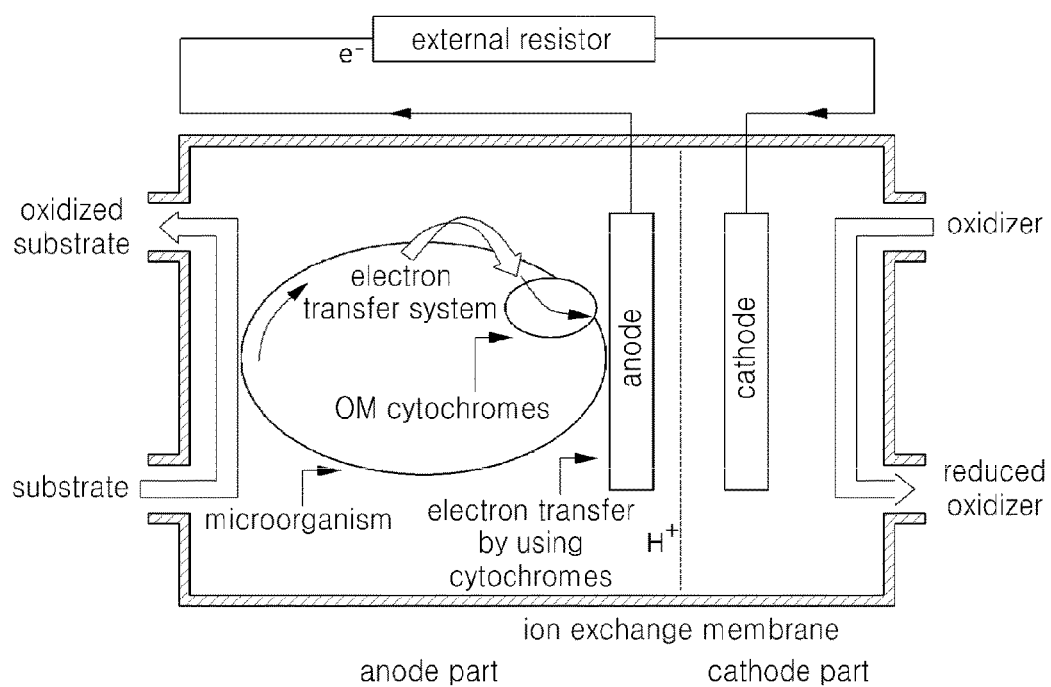
FIG. 1 is a schematic view showing a typical microbial fuel cell according to the related art.

Hereinafter, exemplary embodiments of the present invention will be described with reference to accompanying drawings. The present invention is not limited to the following embodiments, but can be embodied in various forms and includes various equivalents and substitutes within the technical scope of the present invention. The thickness of layers and regions in the drawings may be exaggerated for the purpose of clarity and the same reference numerals will be used to refer to the same elements throughout the specification. If it is determined that description about well known functions or configurations may make the subject matter of the present invention unclear, the details thereof will be omitted.

Embodiment 1

Figure 5:
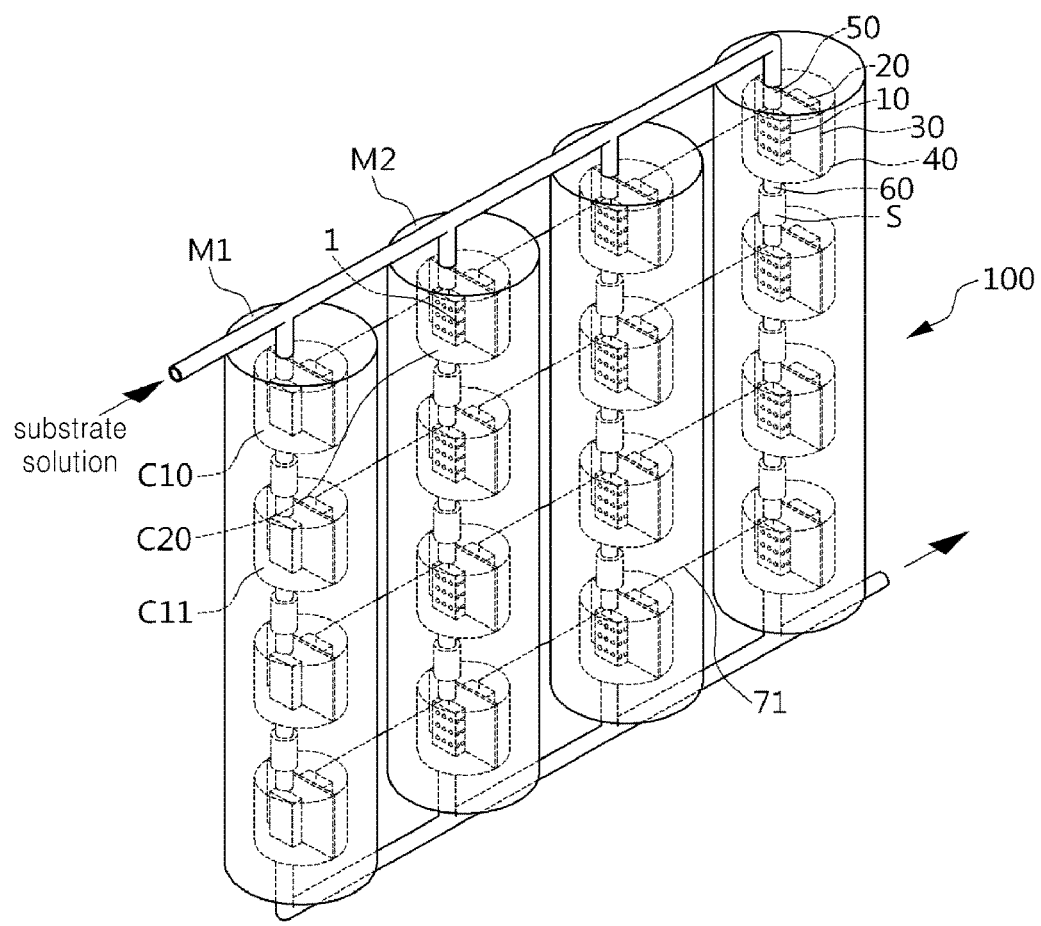
FIG. 5 is a view schematically showing a module system for a microbial fuel cell according to a first embodiment of the present invention.

FIG. 5 is a view schematically showing a module system 100 for a microbial fuel cell according to one embodiment of the present invention. As shown in FIG. 5, the module system 100 for the microbial fuel cell according to one embodiment of the present invention includes a plurality of modules M in which unit cells C vertically arranged are linked with each other through a substrate sharing tube S. In addition, the module system 100 is constructed by connecting a unit cell C10 provided in one module M1 with a unit cell C20 provided in another module M2 through a conductive wire 71 in series.

In detail, each unit cell C includes electrochemically active microorganisms 1, first and second electrodes 10 and 20 having the electrochemically active microorganisms 1 attached thereto, an ion exchange membrane 30 interposed between the first and second electrodes 10 and 20, a reactor 40 serving as a housing for the components, and substrate inlet and outlet ports 50 and 60 formed in one end and the other end of the reactor 40, respectively. The reactor 40 is partitioned by the ion exchange membrane 30 so that the first and second electrodes 10 and 20 are completely separated from each other. The substrate inlet and outlet ports 50 and 60 are provided in one end and the other end of the section of the reactor 40 in which the first electrode 10 is provided. The module M is constructed by linking the substrate inlet port 60 of one cell C10 among the unit cells C vertically arranged with the substrate outlet port 50 of another cell C11 provided below the unit cell C10 through a substrate sharing tube S. The substrate sharing tube S collectively refers to a unit linking the substrate inlet port 50 with the substrate outlet port 60 so that a substrate solution flowing out of the substrate outlet port 60 of one unit cell C10 flows into the substrate inlet port 50 of another unit cell C11. In other words, the substrate sharing tube S refers to all units allowing the substrate solution to flow only in unit cells of the same module without leaking out by linking the substrate outlet port 60 of one unit cell C10 with the substrate inlet port 50 of the other unit cell C11. In addition, the in-series connection is formed by connecting the second electrode 20 of the unit cell C10 provided in one module M1 with the first electrode 10 of a unit cell C20 of another module M2 through the conductive wire 71.

In the module system 100 for the microbial fuel cell according to a first embodiment, the substrate solution flowing into the section for the first electrode 10 provided in the reactor 40 through the substrate inlet port 50 vertically flows through the substrate outlet port 60 and the substrate sharing tube S of each unit cell C, so that the unit cells C provided in the same module M share the substrate solution received therein together. The reactor 40 is completely divided into the section in which the first electrode 10 exists and the section in which the second electrode 20 exists by the ion exchange membrane 30, and the substrate inlet and outlet ports 50 and 60 are provided in one end and the other end of the section of the reactor 40 for the first electrode 10, so that the substrate solution flowed into the section of the reactor 40 for the first electrode 10 through the substrate inlet port 50 does not flow into the section for the second electrode 20, but vertically flows through the substrate outlet port 60. In other words, the substrate solution flows through only sections for the first electrode 10 in each unit cell C.

In the module system 100 for the microbial fuel cell according to the first embodiment, the unit cells C10 and C20 provided in other modules M1 and M2, which do not share the substrate solution together, are connected to each other in series, thereby preventing hydrogen ions from being dispersed between the unit cells C10 and C20 connected to each other in series. In addition, as described above. The hydrogen ions are prevented from being dispersed, so that voltage drop can be prevented.

The first electrode 10 may include an anode, and the second electrode 20 may include a cathode.

The anode may include a carbon electrode or a metal-treated carbon electrode. The carbon electrode preferably includes one selected from the group consisting of carbon paper, carbon cloth, reticulated vitreous carbon, graphite felt, a graphite rod, and graphite granules. More preferably, the carbon electrode includes graphite felt, but the present invention is not limited thereto.

The cathode may include a carbon electrode or a metal-treated carbon electrode. The cathode preferably includes a carbon electrode treated with one selected from the group consisting of platinum (Pt), ruthenium (Ru), osmium (Os), and palladium (Pd). More preferably, the cathode includes a carbon electrode treated with Pt, but the present invention is not limited thereto.

The in-series connection is preferably achieved by connecting the second electrode 20 of the unit cell C10 provided in one module M1 with the first electrode 10 of the unit cell C20 provided in another module M2 through the conductive wire 71, but the present invention is not limited thereto.

The electrochemically active microorganisms 1 may include one selected from the group consisting of *disulfovibrio vulgaris, geobacter metallireducens, geobacter sulfurreducens*, and *shewanella oneidensis*, or the mixture of at least one selected from the group consisting of *disulfovibrio vulgaris, geobacter metallireducens, geobacter sulfurreducens*, and *shewanella oneidensis*. More preferably, the electrochemically active microorganisms 1 include *shewanella oneidensis*, but the present invention is not limited thereto. In addition, the electrochemically active microorganisms 1 preferably includes attached to the surface of the first electrode 10 of each unit cell C, but the present invention is not limited thereto.

Embodiment 2

Figure 6:
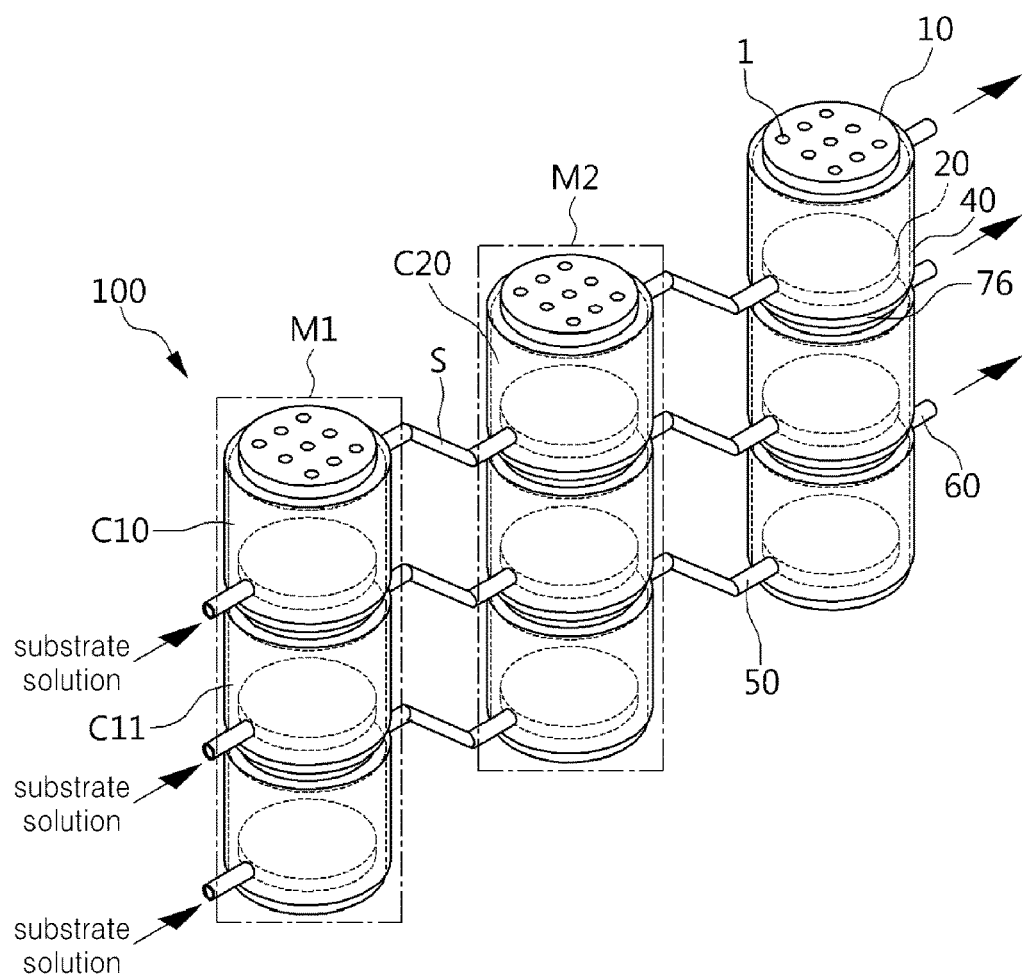
FIG. 6 is a view schematically showing a module system for a microbial fuel cell according to a first embodiment of the present invention.

FIG. 6 is a view schematically showing a module system 100 for a microbial fuel cell according to another embodiment of the present invention. As shown in FIG. 6, the module system 100 for the microbial fuel cell according to another embodiment of the present invention includes a plurality of modules M in which unit cells C vertically arranged are connected with each other in series through a conductive film 76. In addition, the module system 100 is constructed by a substrate outlet port 60 of the unit cell C10 in one module M1 with a substrate inlet port 50 of a unit cell C20 in another module M2 through a substrate sharing tube S.

In detail, each unit cell C includes a reactor 40 has the substrate inlet port 50 and the substrate outlet port 60 formed at lower and upper ends thereof, first and second electrodes 10 and 20 formed on bottom and top surfaces, respectively, and electrochemically active microorganisms 1. Each module M is constructed by connecting the second electrode 20 of one unit cell C10 among unit cells C vertically arranged with the first electrode 10 of another unit cell C11 in series in the state that the first and second electrodes 10 and 20 are attached to the conductive film 76 interposed between the first and second electrodes 10 and 20. The substrate sharing tube S collectively refers to a unit linking the substrate inlet port 50 with the substrate outlet port 60 so that a substrate solution flowing out of the substrate outlet port 60 of one unit cell C10 flows into the substrate inlet port 50 of another unit cell C20. In other words, the substrate sharing tube S refers to all units allowing the substrate solution to flow only in unit cells, which are linked with each other through the substrate sharing tube S, without leaking out by linking the substrate outlet port 60 of one unit cell C 10 with the substrate inlet port 50 of the other unit cell C20.

In the module system 100 for the microbial fuel cell according to a second embodiment, the substrate solution received through the substrate inlet port 50 horizontally flows through the substrate outlet port 60 and the substrate sharing tube S of each unit cell C, so that the unit cells C linked with each other in different modules M share the substrate solution together. In the module system 100 for the microbial fuel cell according to a second embodiment, unit cells C10 and C11 in the same module M, which do not share the substrate solution, are connected to each other in series, so that hydrogen ions are prevented from being dispersed between unit cells C10 and C11 connected to each other in series. In addition, the hydrogen ions are prevented from being dispersed, so that voltage drop can be prevented.

The first electrode 10 may include an anode, and the second electrode 20 may include a cathode.

The anode may include a carbon electrode or a metal-treated carbon electrode. The carbon electrode preferably includes one selected from the group consisting of carbon paper, carbon cloth, reticulated vitreous carbon, graphite felt, a graphite rod, and graphite granules. More preferably, the carbon electrode includes graphite felt, but the present invention is not limited thereto.

The cathode may include a carbon electrode or a metal-treated carbon electrode. The cathode preferably includes a carbon electrode treated with one selected from the group consisting of Pt, Ru, Os, and Pd. More preferably, the cathode includes a carbon electrode treated with Pt, but the present invention is not limited thereto.

The in-series connection is preferably achieved by connecting the second electrode 20 of the unit cell C10 provided in one module M1 with the first electrode 10 of the unit cell C11 vertically provided under the unit cell C10 through the conductive film 76, but the present invention is not limited thereto.

The electrochemically active microorganisms 1 may include one selected from the group consisting of *disulfovibrio vulgaris, geobacter metallireducens, geobacter sulfurreducens*, and *shewanella oneidensis*, or the mixture of at least one selected from the group consisting of *disulfovibrio vulgaris, geobacter metallireducens, geobacter sulfurreducens*, and *shewanella oneidensis*. More preferably, the electrochemically active microorganisms 1 include *shewanella oneidensis*, but the present invention is not limited thereto. In addition, the electrochemically active microorganisms 1 preferably include attached to the surface of the first electrode 10 of each unit cell C, but the present invention is not limited thereto.

Although an exemplary embodiment of the present invention has been described for illustrative purposes, those skilled in the art will appreciate that various modifications, additions and substitutions are possible, without departing from the scope and spirit of the invention as disclosed in the accompanying claims.

Hereinafter, preferable experimental examples will be suggested so that those skilled in the art can comprehend the exemplary embodiment of the present invention. However, the experimental examples are used for illustrative purposes, but the present invention is not limited thereto.

EXPERIMENTAL EXAMPLE 1

Fabrication of Microbial Fuel Cell and Enrichment of System

In order to find out an influence exerted on power generation due to the share of a solution (substrate solution) of an anode part and the in-series connection between unit cells in a microbial fuel cell system, as shown in FIG. 2, two sets of microbial fuel cell systems (first and second microbial fuel cell systems) including two unit cells (unit cells A and B) are constructed. The microbial fuel cell system was constructed by using a reactor (with the size of 5 cm×5 cm×18 cm) including polyacryl-plastic, an anode and a cathode including graphite felts (with the size of 5 cm×5 cm×0.4 cm, Electrosynthesis, NY, USA), an ion exchange membrane including Nafion N424 (Ion Power, INC, DE), and an external conductive wire including platinum wire.

Figure 2A:
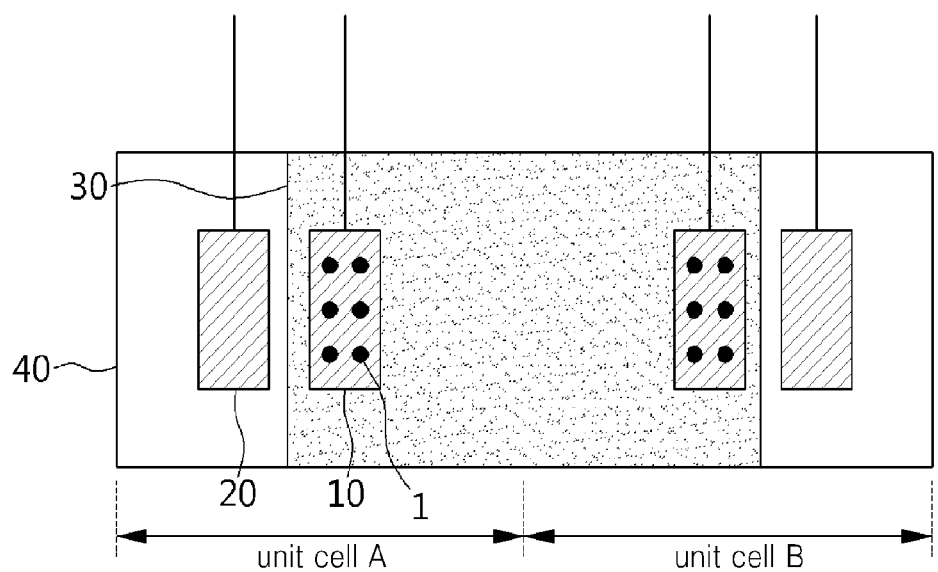
FIG. 2a is a schematic view showing a microbial fuel cell system including two unit cells (unit cells A and B) in which the two unit cells share an anode part together.
Figure 2B:
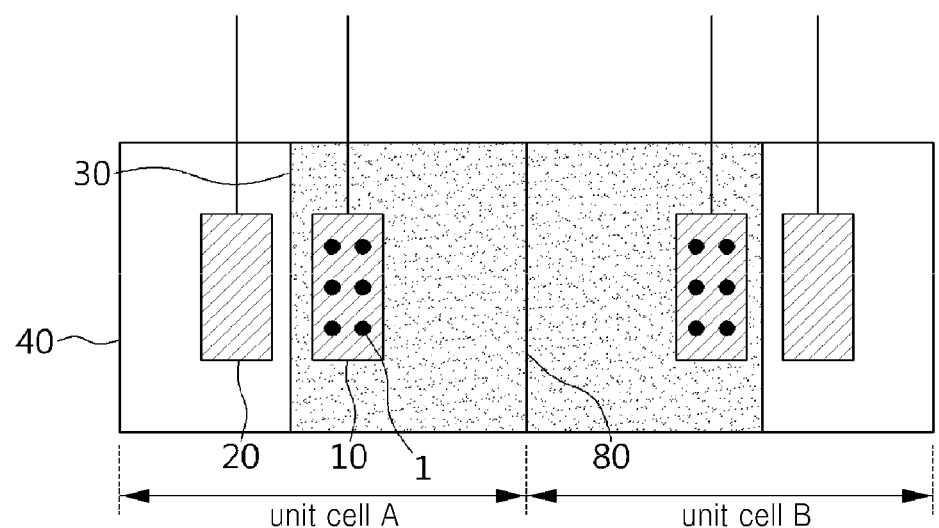
FIG. 2b is a schematic view showing a microbial fuel cell system including two unit cells (unit cells A and B) in which the two unit cells include anode parts separated from each other, respectively.

An acrylic plate was interposed between the two anodes of the unit microbial fuel cell having the above structure, so that anode parts were separated from each other (see FIG. 2b). Then, a 25 mM phosphate buffer solution (pH 7.0) containing 50 mM potassium ferricyanide III was filled in the section of the reactor including a cathode, and the anodes were fed-batch cultured at the temperature of about 30° C. by supplying an anode part solution (substrate solution) (25 mM phosphate buffer solution (pH 7.0)) and 10 mM acetate in an open circuit mode three times for nine days after the anodes had been inoculated into anaerobic digester fluid, thereby enriching the two microbial fuel cell systems (first and second microbial fuel cell systems). After the anodes had been cultured for nine days as described above, the maximum open circuit voltages of the unit cells 1A, 1B, 2A, and 2B were measured as 0.75V, 0.73V, 0.70V, and 0.78V, respectively, as shown in table 1 while representing voltage values approximate to each other. Accordingly, the almost same quantities of microorganisms were attached to the anodes.

TABLE 1

| Unit cell # | 1A | 1B | 2A | 2B |
|---|---|---|---|---|
| Max open circuit voltage (V) | 0.75 | 0.73 | 0.70 | 0.78 |

Thereafter, the four unit cells were worked in a close circuit mode having the connection with an external resistor of 1000Ω, and the anode part solution (substrate solution) (25 mM phosphate buffer solution (pH 7.0)) and the 10 mM acetate were supplied to the anode part whenever a close circuit voltage is dropped to 0.05V or less. In order to acquire a renewable close circuit voltage, the anode part solution (substrate solution) was supplied to the unit cells 1B, 2A, and 2B five times, and was supplied to the unit cell 1A seventh times. Thereafter, the maximum close voltages of the unit cells 1A, 1B, 2A, and 2B were measured as 0.56±0.01V, 0.54±0.00V, 0.54±10.01V, and 0.56±0.01V, respectively, as shown in table 2 while representing values approximate to each other. Accordingly, the microorganisms attached to the anodes were naturally enriched and cultured.

TABLE 2

| Unit cell # | 1A | 1B | 2A | 2B |
|---|---|---|---|---|
| Max open circuit voltage (V) | 0.56 ± 0.01 V | 0.54 ± 0.00 V | 0.54 ± 0.01 V | 0.56 ± 0.01 V |

EXPERIMENTAL EXAMPLE 2

Influence According to Share of Anode Part Solution (Substrate Solution)

In order to find out the influence exerted on the open circuit voltage by the share of the anode part solution after the microbial fuel cell system has been sufficiently enriched as described in Experimental Example 1, the open circuit voltages were measured in a case that the acrylic plate was interposed between the two anodes to separate the anode as shown in FIG. 2a, and a case that the acrylic plate was not interposed between the two anodes, but the two anodes share the anode part solution together as shown in FIG. 2b.

Therefore, as shown in table 3, the open circuit voltages were measured in all unit cells while representing approximate values regardless of the share of the anode part solution. Accordingly, the share of the anode part solution does not exert an influence on the open circuit voltage in the case that the unit cells are separated from each other.

TABLE 3

| | open circuit voltages(V) | | | |
|---|---|---|---|---|
| Unit cell # | 1A | 1B | 2A | 2B |
| Share of anode part solution | 0.77 | 0.77 | 0.76 | 0.75 |
| Non-share of anode part solution | 0.77 | 0.76 | 0.76 | 0.74 |

EXPERIMENTAL EXAMPLE 3

Influence Exerted on In-Series Connection by Share of Anode Part Solution (Substrate Solution)

In order to find out influences exerted on the open circuit voltage by the share state of the anode part solution when a plurality of microbial fuel cells were connected to each other in series, the following experiment was performed.

EXPERIMENTAL EXAMPLE 3-1

Case of Share of Anode Part Solution (Substrate Solution)

Figure 2C:
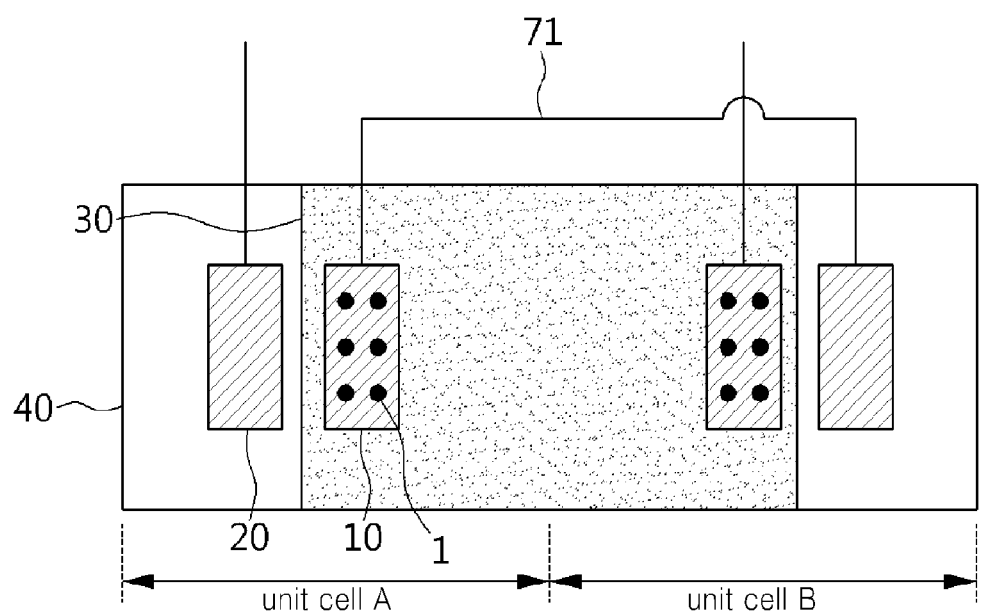
FIG. 2c is a schematic view showing a microbial fuel cell system including two unit cells (unit cells A and B) connected to each other in series in which the two unit cells share an anode part.

First, when the microbial fuel cell system was constructed and the individual unit cells were not electrically connected to each other as shown in FIG. 2a, the open circuit voltages of the unit cells 1A, 1B, 2A, and 2B were measured once more as shown in Experimental Example 2. Then, open circuit voltages of the unit cells 1A, 1B, 2A, and 2B were measured when the unit cells 1A and 1B were connected to each other in series through an external conductive wire, and the unit cells 2A and 2B were connected to each other in series through an external conductive wire as shown in FIG. 2c in order to compare with the case that the unit cells 1A, 1B, 2A, and 2B were not connected to each other in series.

Figure 3A:
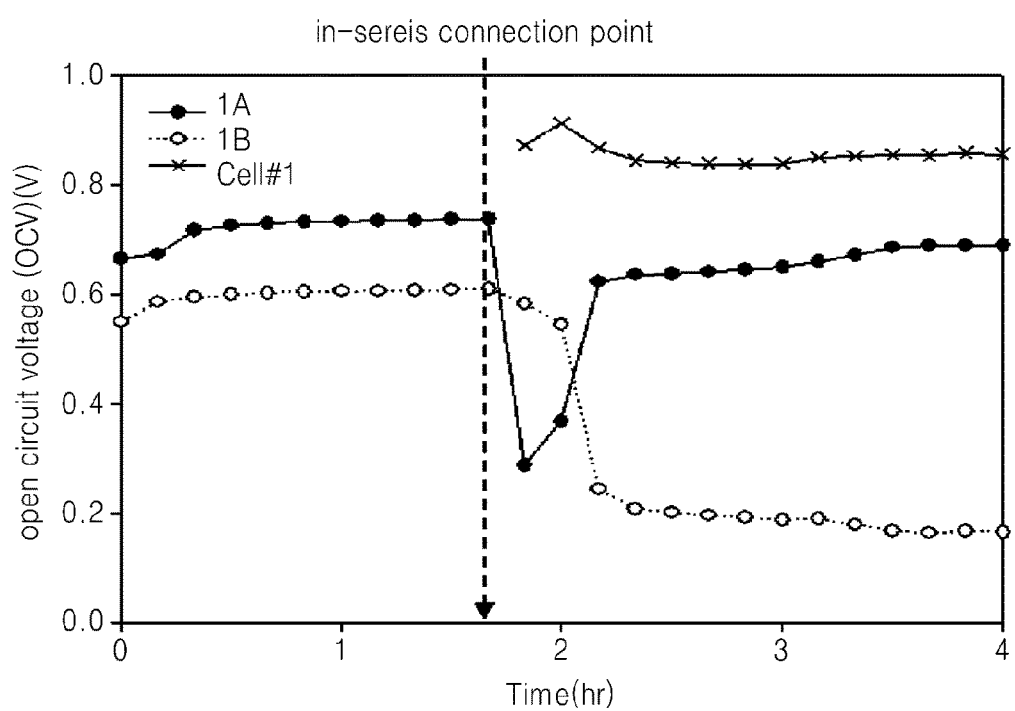
FIG. 3 is a graph showing the voltage variation before and after in-series connection in a microbial fuel cell system including two unit cells (unit cells A and B) connected to each other in series in which the two unit cells share an anode part.
Figure 3B:
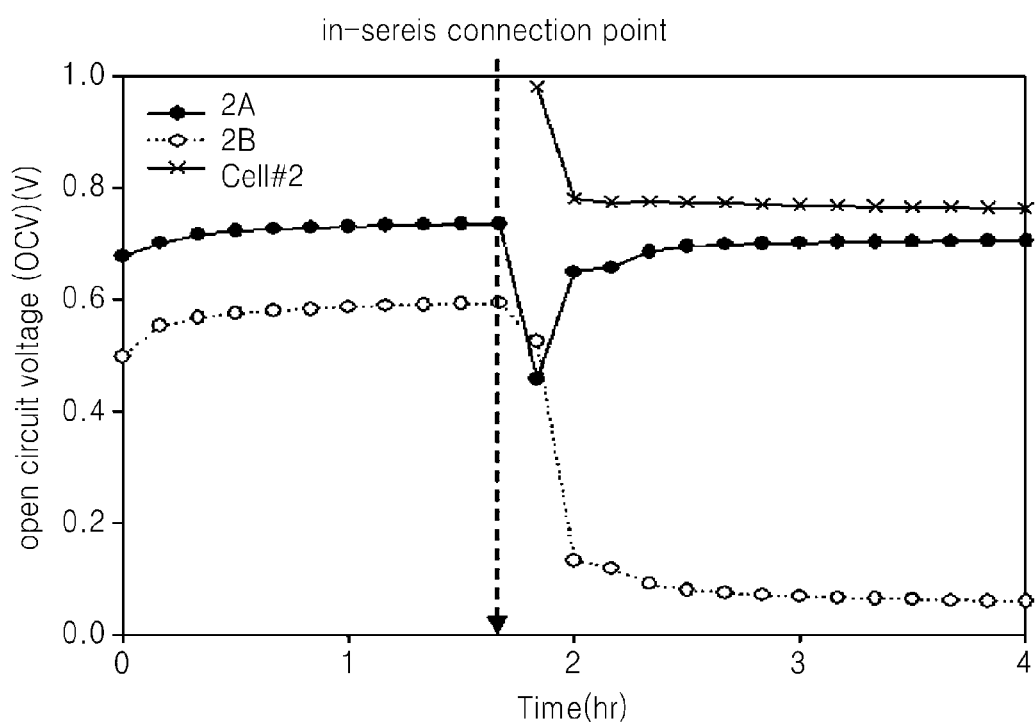

Therefore, as shown in Table 4, the open circuit voltages measured in the individual unit cells after in-series connection were measured lower than the open circuit voltages measured in the individual unit cells before in-series connection. In addition, the whole voltages were measured as 0.86V and 0.75V. Accordingly, it can be recognized that voltage drop occurred (see FIG. 3).

TABLE 4

| Unit cell | Share state of in-series connection | A (V) | B (V) | Whole Voltage (V) |
|---|---|---|---|---|
| 1 | X | 0.74 | 0.61 | |
|   | ○ | 0.71 | 0.15 | 0.86 |
| 2 | X | 0.73 | 0.59 | |
|   | ○ | 0.72 | 0.03 | 0.75 |

Therefore, when the anode part solution is shared and a plurality of microbial fuel cells are connected to each other in series, voltage drop occurs.

EXPERIMENTAL EXAMPLE 3-2

Case of Non-Share of Anode Part Solution (Substrate Solution)

Figure 2D:
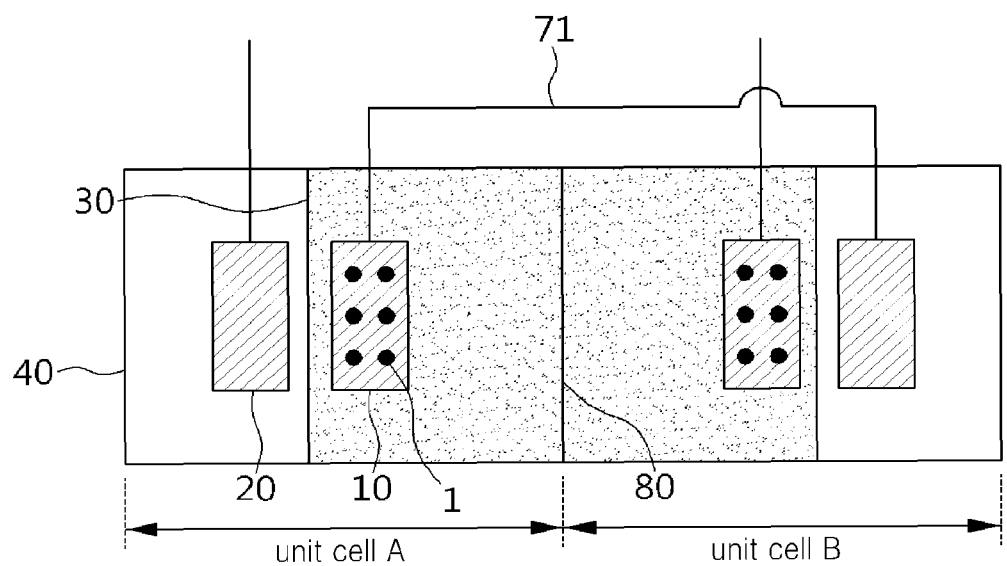
FIG. 2d is a schematic view showing a microbial fuel cell system including two unit cells (unit cells A and B) connected to each other in series in which the two unit cells include anode parts separated from each other, respectively.

First, when the microbial fuel cell system was constructed and the unit cells were not electrically connected to each other as shown in FIG. 2b, the open circuit voltages of the unit cells 1A, 1B, 2A, and 2B were measured once more as shown in Experimental Example 2. Then, open circuit voltages of the unit cells 1A, 1B, 2A, and 2B were measured when the unit cells 1A and 1B were connected to each other in series through an external conductive wire, and the unit cells 2A and 2B were connected to each other in series through an external conductive wire as shown in FIG. 2d in order to compare with the case that the unit cells 1A, 1B, 2A, and 2B were not connected to each other in series.

Figure 4A:
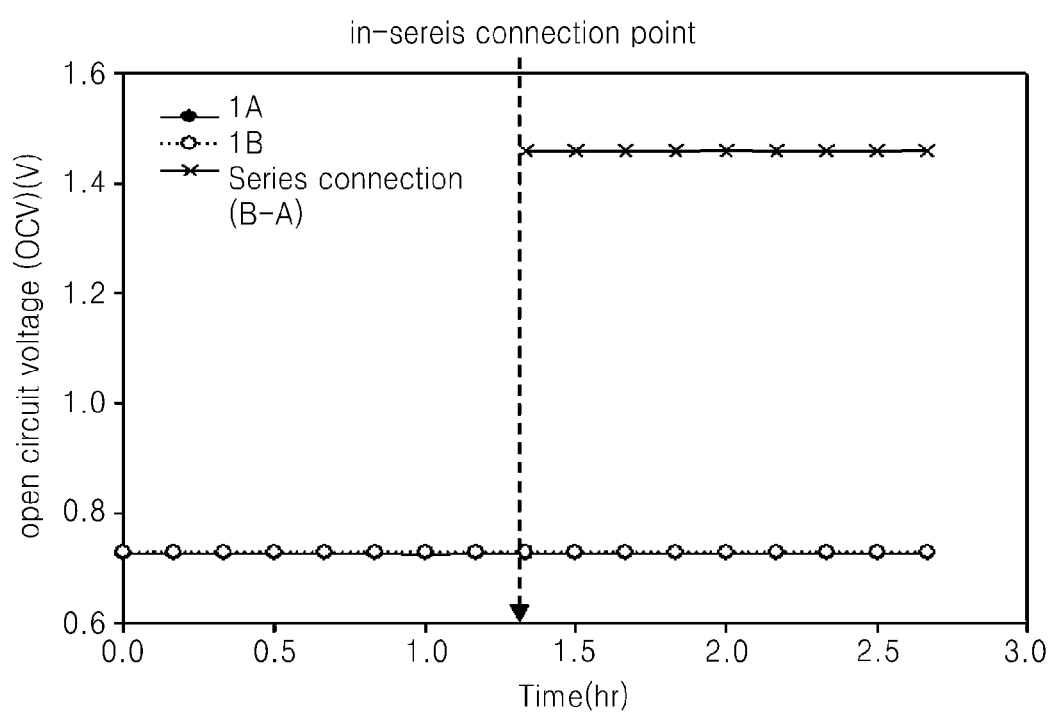
FIG. 4 is a graph showing the voltage variation before and after in-series connection in a microbial fuel cell system including two unit cells (unit cells A and B) connected to each other in series in which the two unit cells include anode parts separated from each other, respectively.
Figure 4B:
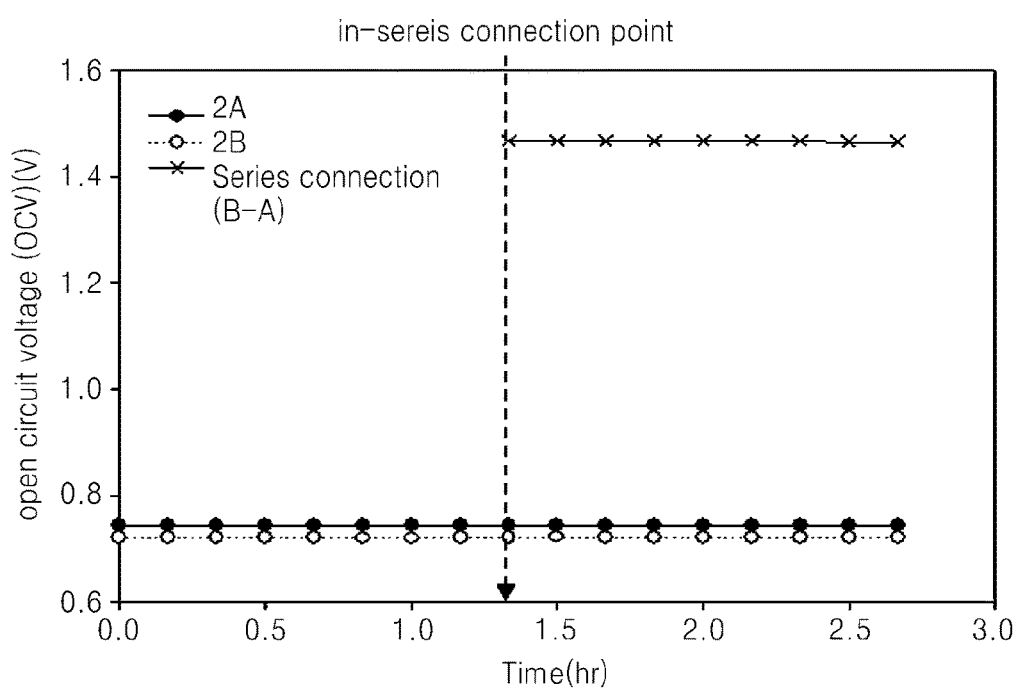

Therefore, as shown in Table 5, the open circuit voltages of the unit cells are equal to each other after and before in-series connection. In the case of in-series connection, the sum of the individual open circuit voltages of the unit cells A and B is equal to the whole open circuit voltage (See FIG. 4).

TABLE 5

| Unit cell | Share state of in-series connection | A (V) | B (V) | Whole Voltage (V) |
|---|---|---|---|---|
| 1 | X | 0.73 | 0.73 | |
|   | ○ | 0.71 | 0.73 | 1.46 |
| 2 | X | 0.74 | 0.74 | |
|   | ○ | 0.74 | 0.72 | 1.47 |

Therefore, when the anode part solution is not shared, there is no difference between the individual voltages before and after in-series connection, and the energy of a high voltage can be generated without loss of a voltage by the in-series connection of the unit cells.

Following results can be recognized based on Experimental Examples 3-1 and 3-2. When a plurality of microbial fuel cells are connected to each other in series, and constructed to share the anode part solution together, voltage drop occurs to cause voltage loss. However, when the anode part is partitioned so that the anode part is given to each unit cell, the voltage drop can be prevented. Therefore, based on the results of the experimental examples, the microbial fuel cell system is manufactured in which a plurality of microbial fuel cells serving as individual unit cells are electrically connected to each other in series, and share the anode part solution together.

What is claimed is:

1. A module system for a microbial fuel cell, the system comprising a plurality of modules and a conductive film, each module comprising:
   a plurality of vertically arranged unit cells, each unit cell comprising
      a reactor provided in a lower end and an upper end thereof with a plurality of substrate inlet ports and a plurality of substrate outlet ports, respectively;
      a first electrode and a second electrode formed on a bottom surface and a top surface of the reactor, respectively; and
      electrochemically active microorganisms,
   wherein
      the vertically arranged unit cells provided within at least a first module of the plurality of modules are electrically connected to each other in series through the conductive film, and
      at least one of the substrate outlet ports of the unit cell provided in at least the first module is linked with at least one of the substrate inlet ports of a unit cell provided in at least a second module of the plurality of modules through a substrate sharing tube,
      wherein a substrate solution received through each substrate inlet port flows horizontally through each substrate outlet port and the substrate sharing tube of each unit cell, so that the unit cells linked in the first module and the second module share the substrate solution that passes through a region of the reactor housing the first electrode and the second electrode of each unit cell linked through the substrate sharing tube, and
      wherein the conductive film is arranged horizontally and completely separates the second electrode of the first module and the first electrode of the second module.

2. The module system of claim 1, wherein the first electrode is an anode, and the second electrode is a cathode.

3. The module system of claim 2, wherein the anode and the cathode include one of a carbon electrode and a metal-treated carbon electrode.

4. The module system of claim 1, wherein the electrochemically active microorganisms include one selected from the group consisting of disulfovibrio vulgaris, geobacter metallireducens, geobacter sulfurreducens, and shewanella oneidensis, or a mixture of at least one selected from the group consisting of disulfovibrio vulgaris, geobacter metallireducens, geobacter sulfurreducens, and shewanella oneidensis.

5. The module system of claim 1, wherein the electrochemically active microorganisms are attached to a surface of the first electrode.

6. The module system of claim 1, wherein the second electrode of one unit cell is connected to the first electrode of another unit cell in series.

* * * * *